Nov. 11, 1941.    G. CHRISTENSON    2,261,962
PACKING
Filed March 11, 1939

INVENTOR
GEORGE CHRISTENSON
BY Virgil C. Kline
ATTORNEY

Patented Nov. 11, 1941

2,261,962

UNITED STATES PATENT OFFICE 2,261,962

PACKING

George Christenson, Plainfield, N. J., assignor to Johns-Manville Corporation, New York, N. Y., a corporation of New York Application March 11, 1939, Serial No. 261,197

9 Claims. (Cl. 309—33)

My present invention relates to piston and cylinder assemblies, and particularly to an improved packing to be employed therewith.

The invention is primarily concerned with, but not limited to, the provision of an improved packing for piston assemblies of the type employed for air brake cylinders. Heretofore, the pistons of such mechanisms have conventionally carried a packing, often referred to in the art as a "cup packing," having a lip or flange for sliding and sealing engagement with the cylinder wall and a base portion resting on the piston head. The pistons have included a keeper ring overlying the base portion of the packing, the keeper ring being secured by studs, bolts, or the like passing through the ring and base and into the piston head.

An object of the present invention is the provision of a packing and piston assembly of simplified construction, eliminating a number of the parts heretofore employed in the conventional mechanisms of this type.

A further object of the invention is to provide a packing which is capable of maintaining a fluid tight seal between a piston and its cooperative cylinder at all times and under all conditions of operation to which the piston and cylinder assembly is subjected.

Another object of the invention is the provision of a packing for a piston and cylinder assembly which can be readily installed and replaced.

A still further object of the invention is the provision of an improved packing to be employed with pistons of the conventional type.

Figure 1:
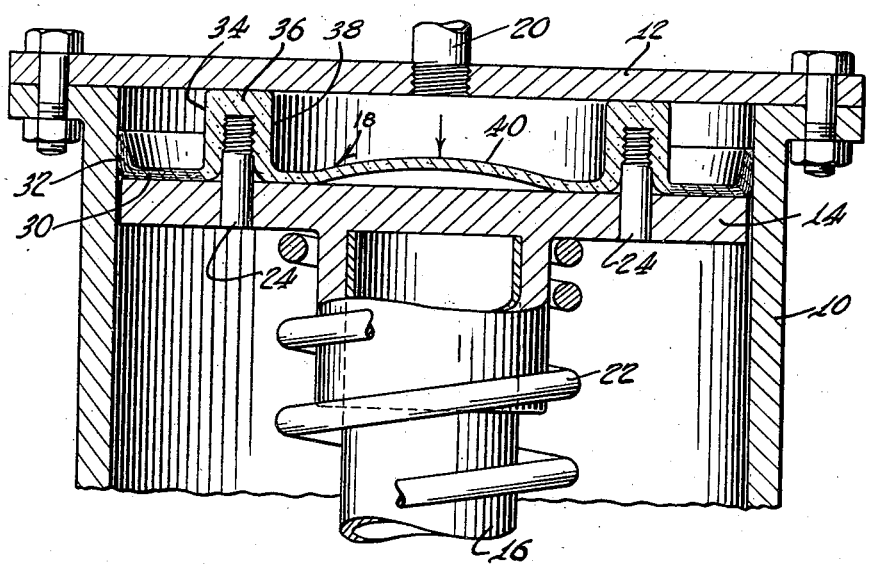
Figure 2:
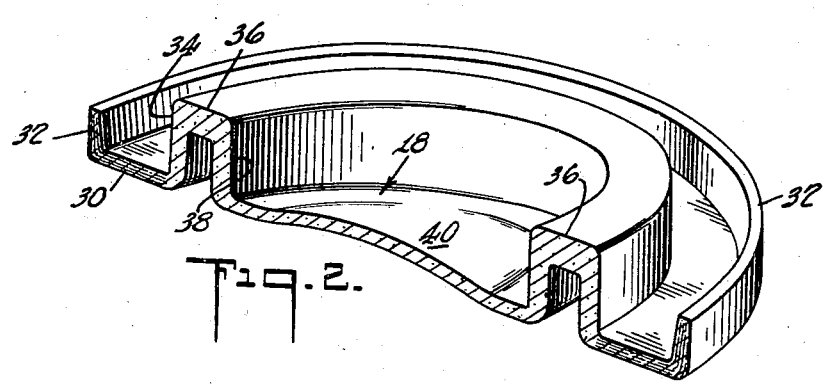

My invention will be more fully understood and further objects and advantages thereof will become apparent when reference is made to the more detailed description thereof which is to follow and to the accompanying drawing in which Fig. 1 is a fragmentary central sectional view of a piston and cylinder assembly embodying the present invention; and Fig. 2 is a fragmentary view partially in perspective and partially in section of a packing of the present invention.

The present invention is particularly applicable to air brake assemblies, and for the purposes of explanation, it will be illustrated and described as applied to a single acting piston of the type commercially employed in such assemblies. It is to be understood, however, that a packing of the present invention may be employed with pistons of many types.

Referring now particularly to Fig. 1, a piston cylinder assembly, such as employed in air brake mechanisms, is illustrated. The assembly includes a cylinder 10, cylinder head 12, piston 14, the latter carried by a suitable piston rod 16, and a piston packing 18. In the operation of a conventional assembly of this type, air under pressure is admitted through an air intake 20 in the head 12 to force the piston downwardly against the action of a spring 22. Upon release of the air pressure, the spring 22 restores the piston to its position at the head of the cylinder.

The piston 14 conventionally includes studs or bolts 24 which, heretofore, were employed to secure a keeper ring and an extending base of the packing member, as previously pointed out. The studs or bolts served the further function of a stop or spacer to prevent crushing of the flanges of the packings against the cylinder head.

In accordance with the instant invention, the packing 18 is so constructed as to be continuous over the entire area of the piston and to be secured thereon by direct coaction with the studs or bolts 24, conventionally projecting from the piston head, or with other similar means specifically provided for the purpose. The packing, in accordance with the invention, comprises a base portion 30 having formed integrally therewith an upstanding continuous flange or lip 32 arranged for sliding and sealing engagement with the wall of the cylinder 10. The base 30 and flange 32 of the packing are suitably formed of a laminated fabric impregnated with a material such as a rubber composition, the laminated fabric in the base and flange being continuous.

Integrally secured to the inner periphery of base 30 is an upstanding flange or wall 34 continuous with an annular portion 36, which, in turn, is continuous with a second flange 38, the flanges and annular portion forming an annular member of substantially inverted U-shape in cross section integral with the base 30. The packing also includes a central portion 40 preferably formed integrally with the inner flange 38. Suitably, the flanges 34 and 38 and portions 36 and 40 are composed of the same or a similar composition as the impregnating material used in the base 30 and flange 32, the reinforcing fabric or the like, however, being omitted. If desired, the flanges 34 and 38 and portions 36 and 40 may be formed from other relatively yieldable or distortable materials. The central portion 40 preferably has a diameter slightly greater than the inner diameter of the flange 38, whereby it is somewhat bowed as illustrated in the drawing.

In assembling the packing of the instant invention, with a piston of the type previously conventionally employed, the keeper ring and securing nuts for the studs 24 are discarded. The packing is forced down upon the piston head with the threaded ends of the studs or bolts 24 extending within the inverted U-shaped channel formed by the flanges 34 and 38 and annular portion 36. The U-shaped portion is suitably dimensioned to provide a tight fit with the studs, whereby the threads enter the inner walls of the flanges 34 and 38 to provide a secure locking engagement therewith. It will be understood that other means may be substituted for the studs 24. Thus, the piston head may be provided with any suitable type of projections, either forming a continuous flange or located at spaced intervals, the projections including serrations or the like which will bite into and interlock with the deformable walls of the U-shaped member. However, one of the characteristics of the packing of the instant invention is its adaptability for use with pistons of conventional standard construction, whereby the packings may be readily substituted for those now employed.

In the operation of a piston cylinder assembly incorporating the instant invention, the entrance of air under pressure within the space between the cylinder head 12 and piston 14 forces the walls of flanges 34 and 38 to conform with the threads or other serrations on the studs 24 or similar means projecting from the piston and thus increases the positive interlock between the packing and the piston particularly during the working stroke of the piston.

As has been previously pointed out, a packing in accordance with the present invention may be readily substituted for the packing ring now standard equipment on air brake pistons, without requiring modification of the piston. The instant packing, furthermore, does not require means to pass through the same to secure it in place, thereby eliminating the necessity of perforations and the possibility of leakage therethrough. A construction in accordance with the present invention exhibits the further advantage that the annular portion 36 overlying the ends of studs or projections 24 provides a yieldable bumper to prevent sharp impacts of the studs or projections with the cylinder head.

Having thus described my invention in rather full detail, it will be understood that these details need not be strictly adhered to, but that various changes and modifications will suggest themselves to one skilled in the art, all falling within the scope of the invention as defined by the subjoined claims.

What I claim is:

1. A piston packing comprising an annular base, a central imperforate portion, an annular imperforate member of inverted U-shape cross section and including flanges integrally secured to said central portion and the inner periphery of said base respectively, and a flange extending from the outer periphery of said base and arranged for sliding and sealing engagement with a cylinder wall.

2. A piston packing comprising an annular base, a central imperforate portion, an annular imperforate member of inverted U-shape cross section including flanges integrally connected with said central portion and the inner periphery of said base respectively, and a flange extending from the outer periphery of said base and arranged for sliding and sealing engagement with a cylinder wall, said U-shaped portion being of greater height than said flange.

3. An assembly comprising a piston and a packing therefor, said piston including a substantially flat head and studs projecting therefrom, and said packing comprising an annular base seated on said head, a central imperforate portion, and an annular member of inverted U-shape in cross section including flanges integrally connected with said central portion and the inner periphery of said base, respectively, said annular member embracing said projecting studs, and a flange extending from the outer periphery of said base and arranged for sliding and sealing engagement with a cylinder wall.

4. A piston packing comprising an imperforate portion shaped to cover a flat head of a piston and a flange extending from the outer periphery of said portion and adapted for sliding and sealing engagement with a cylinder wall, said imperforate portion including a central section and integral means adjacent thereto for locking engagement with an element of the piston, said central section and integral means being so constructed and arranged that fluid pressure on the central portion enhances the locking engagement of the integral means.

5. A piston packing comprising an imperforate portion shaped to cover a flat head of a piston and a flange extending from the outer periphery of said portion and adapted for sliding and sealing engagement with a cylinder wall, said imperforate portion including an outwardly bowed central section and a hollow annular projecting means integrally connected thereto to receive an element of the piston whereby fluid pressure on said central section tends to expand the periphery thereof and force said projecting means into tight engagement with said element.

6. A piston packing comprising an annular base, a bowed central imperforate portion, an annular imperforate member of inverted U-shape cross section and including flanges integrally secured to said central portion and the inner periphery of said base respectively, and a flange extending from the outer periphery of said base and arranged for sliding and sealing engagement with a cylinder wall.

7. A piston packing comprising an imperforate portion shaped to cover the head of a piston, a flange extending from the outer periphery of said portion and adapted for sliding and sealing engagement with a cylinder wall, and hollow, axially projecting means in the form of an annulus composed of a distortable material and comprising a part of said imperforate portion adapted for locking engagement with elements of a piston.

8. An assembly comprising a piston and a packing therefor, said piston including a substantially flat head and studs projecting therefrom in annular arrangement, and said packing comprising an annular base seated on said head, a central imperforate portion and an annular imperforate portion between said base and central portion and integrally connected therewith, said annular imperforate portion comprising hollow, axially projecting, substantially parallel-sided means embracing said studs, and a flange from the outer periphery of said base and arranged for sliding and sealing engagement with the cylinder wall.

9. A piston packing comprising an annular base, a central imperforate portion, and an annular imperforate portion between said base and central portion and integrally connected therewith, said annular imperforate portion comprising hollow, axially projecting, substantially parallel-sided means for receiving therein and embracing elements of a piston, and a flange extending from the outer periphery of said base and arranged for sliding and sealing engagement with a cylinder wall.

GEORGE CHRISTENSON.